US005656345A

United States Patent [19]
Strand et al.

[11] Patent Number: 5,656,345
[45] Date of Patent: Aug. 12, 1997

[54] ADHESIVE COMPOSITIONS AND ADHESIVELY JOINED PIPE SEGMENTS

[75] Inventors: Richard M. Strand, Hampstead, N.H.; Paul C. Briggs, Beverly, Mass.

[73] Assignee: Illinois Tool Works, Inc., Glenview, Ill.

[21] Appl. No.: 481,025

[22] Filed: Jun. 7, 1995

[51] Int. Cl.$^6$ .................................................. B32B 1/08
[52] U.S. Cl. .................. 428/36.9; 428/518; 138/DIG. 1; 524/505; 525/71
[58] Field of Search .............................. 428/36.9, 36.91, 428/36.92, 518, 519, 517, 521; 138/DIG. 1; 524/504, 505; 525/71; 156/158

[56] References Cited

U.S. PATENT DOCUMENTS

| | | | |
|---|---|---|---|
| H1128 | 1/1993 | Mallikarjun | 526/271 |
| 4,126,504 | 11/1978 | Wolinski et al. | 156/310 |
| 4,200,480 | 4/1980 | Wolinski et al. | 156/294 |
| 4,536,546 | 8/1985 | Briggs | 525/83 |
| 5,416,142 | 5/1995 | Bush et al. | 524/113 |

*Primary Examiner*—Donald Loney
*Assistant Examiner*—Chris Kyriakou
*Attorney, Agent, or Firm*—Synnestvedt & Lechner

[57] ABSTRACT

A high strength conduit for carrying potable water at temperatures of up to about 180° F. comprising a first tubular member having a mating end portion formed from polyvinyl chloride, a second tubular member having a mating end portion also formed from polyvinyl chloride, telescopically received in the mating portion of the first tubular member, a cured adhesive composition joining said mating end portions of the first and second tubular members. The cured adhesive composition is formed from a curable composition comprising a minor proportion by weight of a thermoplastic elastomeric copolymer comprising from about 40 to about 97 weight percent of recurring units of a monovinyl aromatic monomer, from about 1 to about 30 weight percent of recurring units of an $\alpha,\beta$-unsaturated dicarboxylic acid anhydride, from about 1 to about 30 weight percent of recurring units of an $\alpha,\beta$-unsaturated carboxylic acid, and from about 1 to about 40 weight percent of recurring units of a $C_1$–$C_4$ alkyl ester of methacrylic acid. On the basis of 100 parts of the thermoplastic elastomeric copolymer of (a), from about 1 to about 35 parts by weight of an elastomer comprising a block copolymer of butadiene and styrene is also included. The composition also includes major proportion by weight of reactive solvent for the thermoplastic copolymer, such as methyl methacrylate monomer, and a catalyst for said reactive solvent.

9 Claims, No Drawings

ADHESIVE COMPOSITIONS AND ADHESIVELY JOINED PIPE SEGMENTS

The present invention relates to novel polymer-containing compositions and to conduit connections which include said compositions as functional components. More particularly, this invention relates to curable compositions useful for sealing and adhesively joining two or more mechanical members, particularly pipe sections.

Numerous factors are involved in the design of adhesive systems used to join sections of tubular conduit, especially conduits utilized in the transfer and delivery of water, steam and the like. One criterion affecting the quality of such adhesive systems is the extent to which a strong and durable bond is formed between the pipe sections. Another important criterion in certain embodiments is the ability of the bond to remain strong and durable even under relatively high temperature conditions. This is so because in certain applications the fluids being transported in the conduit systems are heated to elevated temperatures, such as 180° F.

In addition, many applications require that the pipe connections be made not in a factory setting, but under field conditions. As a result, it is important that the adhesive system allow the connection to be made in the shortest period of time, in an efficient and safe fashion, and with a minimum of inconvenience to the field craftsperson or technician.

Numerous types of adhesives are currently used to join plastic pipe sections, including pipe sections formed from poly (vinyl chloride) (PVC). By far the most commonly used adhesive system for joining PVC pipe, particularly PVC pipe used in the transfer of potable water, is solvent-based cement. Such cements utilize two main components: (1) resin which is the same as or at least compatible with the material from which the mechanical member is formed (e.g., PVC) and (2) solvent for the resin. The solvent acts to solvate and soften a portion of the material which constitutes the surface of the pipe to be joined. When the surfaces to be bonded are placed in intimate contact, entanglement of the polymer chains from each surface occurs as the softened resin flows together. Bond strength is developed as the solvent evaporates and the resin begins to harden. In addition, the resin which is dissolved in the solvent portion of the cement composition becomes intermixed with the resin from each surface to be joined, thereby creating continuity and strength between the pipe segments as the solvent portion of the adhesive evaporates. As a result of such modes of operation, solvent-welded pipe systems have joint strengths approaching those of the original PVC pipe.

PVC piping systems, and systems based upon similar thermoplastic polymers, are in widespread use not only for the transfer of potable water, but also for the transfer of water in drainage, waste and vent systems for the home and in industry. Such pipe systems are also frequently used in turf and agricultural sprinkler systems and the like. As a result, a very large number of solvent welded pipe joints are formed each day.

While solvent-welded PVC pipe joints have several desirable features, including high strength and durability, applicants recognize several disadvantages with the use of such systems. For example, evaporation of the solvent from such systems is not only highly undesirable from an environmental point of view, it may now and in the future be prohibited by local, state and/or federal laws and regulations. In typical formulations, about 70 to about 90% of the adhesive material is a volatile solvent, such as tetrahydrofurane (THF), methylethylketone (MEK), cyclohexanone, acetone, dimethylformamide (DMF), and the like. On a volume basis, typical volatile organic compound (VOC) contents of PVC and CPVC solvent adhesives range from about 775 to about 850 grams per liter. For adhesive systems used in connection with ABS systems, typical VOC contents range from about 650 to about 750 grams per liter.

Attempts have heretofore been made to overcome certain of the deficiencies associated with the use of solvent adhesives. For example, U.S. Pat. No. 5,252,634—Patel et al. attempts to reduce the VOC problem associated with solvent adhesives by utilizing a silica-aluminum alloy in the form of hollow spheres. Such an approach is said to increase the solids content of the adhesive and thereby decrease the volatile volume in such adhesives.

Applicants recognize, however, that solutions of the type described in the Patel et al patent are less than fully satisfactory. For example, while the use of volatile agents in the adhesive may be reduced, it is not eliminated. Accordingly, solvent compounds considered to be health hazards, such as tetrahydrofurane and others, remain detrimentally present. This detriment is especially troublesome when solvent welding is to be done in a relatively enclosed space, such as a ditch, as is frequently the case. The toxic solvent vapors can accumulate at levels which may cause dizziness and/or other discomfort to the workers installing the pipe. Furthermore, certain of these solvents are highly flammable, therefore creating a further hazard.

Reactive adhesive systems have also been suggested for use in connection with the joining of pipe segments. For example, U.S. Pat. No. 4,200,480—Wolinski et al. states that epoxy adhesives are the bonding material of choice when pipes are used to convey hot water or steam because of the chemical inertness and resistance to high temperatures exhibited by such materials. However, such epoxy systems are noted to have disadvantages. For example, the pot life of such mixed adhesives is relatively short, being less than 30 minutes. After being coated and joined together, the pipe ends are heated to accelerate cure. One disadvantage of the use of epoxy adhesives, as noted in Wolinski et al., is that during the heating step the epoxy adhesive becomes very fluid and, as a result, flows out of the joint and into the conduit. This material eventually hardens and potentially impedes the flow of fluid through the pipe.

Wolinski et al. describes, as an improvement to epoxy adhesives, the use of a composition comprising a nonreactive thermoplastic polymer resin dissolved in a polymerizable acrylic monomer and a copolymerizable acid monomer. Wolinski et al. further indicates that several modifications of this basic formula are disclosed in U.S. Pat. No. 3,994,764, in application Ser. No. 705333 (now U.S. Pat. No. 4,080, 238), and in application Ser. No. 763,145 (now U.S. Pat. No. 4,126,504).

Applicants have recognized, however, that several significant disadvantages are also associated with the systems of the type suggested by Wolinski et al. For example, each of the systems suggested by Wolinski et al. utilizes a polymerizable acid monomer as an essential component. The acid monomers disclosed in Wolinski et al. are not only relatively expensive, they are also generally considered to be toxic under certain circumstances. Such materials pose a potential safety hazard to the workers who utilize the adhesive system and can also be difficult to transport because they are both corrosive and flammable. Furthermore, applicants have recognized that in many applications involving the transport of potable water, the presence of such substances may prove to be a health hazard to the intended user of the water. As a result, safety considerations may well preclude the use of the Wolinski et al. adhesives in potable water systems.

Applicants have determined that perhaps the most important disadvantage of previously disclosed reactive adhesive systems is the failure of such systems to achieve bond characteristics comparable to those of solvent welding. As described above, solvent welding produces a bond possessing mechanical properties essentially the same as those of the material from which the members are formed. Accordingly, the application of force to the joined members produces a mechanical response that is substantially continuous across the bond. Such mechanical response continuity does not exist in bonds formed according to prior art reactive systems.

Applicants have thus noted a failure of the prior art to provide adhesives which overcome the significant disadvantages associated with solvent welding while maintaining the strength, durability and temperature resistance of such systems. Applicants have discovered novel polymer containing compositions which satisfy the long-demanded need for materials possessing this set of desirable characteristics.

SUMMARY OF THE INVENTION

Applicants have found that the deficiencies of the prior art can be overcome by adhesive compositions which provide an unusual and difficult to obtain combination of properties. According to one aspect of the invention, therefore, applicants have discovered reactive solvent-polymer adhesive compositions which, when cured, provide maximum response continuity across the bond portion of the adhesive system. As used herein, the term "adhesive system" refers to any mechanical system comprising two members bonded together by an adhesive. The adhesive systems of the present invention thus preferably possess strength and durability characteristics that are substantially equivalent or superior to the strength and durability of the weakest member being joined. More particularly, applicants have discovered that a superior joint is achieved by utilizing a cured polymer/reactive solvent adhesive system in which at least certain portions of the stress-strain response curve of the cured adhesive match, and preferably substantially match, corresponding portions of the stress-strain response curve of the weakest member being joined. According to especially preferred embodiments, the cured adhesive system possesses an elastic limit ratio, as defined hereinafter, of no less than about 0.75. For embodiments in which the members being joined comprise PVC, CPVC or similar plastics, the adhesives themselves have a lap shear strength of at least about 3000 psi.

The curable polymer/reactive solvent adhesive compositions of the present invention include as essential components thermoplastic elastomeric polymer or TEP (as defined hereinafter) and reactive components capable of at least partially dissolving or dispersing the thermoplastic elastomeric polymer. Thus, the term "reactive solvent" is used herein to refer not only to reactive components capable of dissolving the TEP, but also components capable of at least partially dispersing the TEP. According to especially preferred embodiments, the TEP is an FDA and USDA approved food contact polymer comprising about 40 to 97 weight percent of recurring units of a monovinyl aromatic monomer, from about 1 to about 30 weight percent of recurring units of an $\alpha,\beta$-unsaturated dicarboxylic acid anhydride, from 1 to 30 weight percent of recurring units of an $\alpha,\beta$-unsaturated carboxylic acid, from 1 to 40 weight percent of recurring units of a $C_1$–$C_4$ alkyl ester of methacrylic acid, and from about 10 weight percent to about 20 weight percent of an elastomeric block copolymer. Furthermore, the reactive solvent preferably comprises methyl methacrylate, which, when polymerized, is also approved for food contact by the FDA. As a result, applicants have discovered adhesive compositions which not only possess highly desirable mechanical properties, but which also substantially reduce or eliminate the environmental and safety hazards associated with prior art adhesives. More particularly, the preferred compositions do not require the presence of either volatile organic solvents or toxic or potentially toxic components. Applicants have found that these substances can be avoided, in part, because the reactive solvent, such as methyl methacrylate monomer, serves to solvate and soften the surface of the plastic pipe prior to reacting to a hardened state.

According to certain preferred embodiments, the thermoplastic elastomeric polymer is characterized by a glass transition temperature (Vicat) of at least about 180° F., and a molecular weight of from about 180,000 to about 230,000.

Because of the unique combinations of properties described above, the compositions of the present invention are especially well suited for use as adhesive systems in the joining of conduit sections, particularly pipe sections comprised of plastic components. Applicants have found that exceptional performance is achieved when the preferred compositions of the present invention are used to join pipe sections formed from PVC, chlorinated polyvinyl chloride (CPVC) or acrylonitrile-butadiene-styrene (ABS) polymer.

DETAILED DESCRIPTION OF PREFERRED EMBODIMENTS

I. THE COMPOSITIONS

The present invention provides curable adhesive compositions requiring three essential components: (1) reactive solvent, and preferably reactive solvent monomer; (2) thermoplastic elastomeric polymer, soluble, dispersable, swellable or otherwise miscible in the reactive monomer, preferably an organic polymer composite comprising block copolymers; and (3) a catalyst system for the reactive solvent. The preferred curable compositions are free-radical catalyzed adhesives which form bonds of high strength when cured. Furthermore, the preferred compositions are substantially 100% reactive and do not rely in any way on the loss or evaporation of organic solvents or water to develop strength.

While it is contemplated that the adhesive compositions may include the catalyst system and other adjuvants in a one-part composition, the preferred adhesives are generally provided as two-part compositions. In such embodiments, the first part preferably comprises the reactive monomer and the thermoplastic elastomeric polymer, and the second part comprises at least a portion of the catalyst system. Such systems are adaptable for use in accordance with any one of several techniques. For example, the polymer-in-monomer solution may be applied to one of the members to be joined while all or part of the catalyst system is applied to the second member. When the members are joined, the composition is activated and curing then begins. It is generally preferred, however, that all or part of the catalyst system be mixed into the polymer-in-monomer solution just prior to use, and the mixture then being applied to at least one of the surfaces to be bonded.

One aspect of the present invention provides kits comprising a first container holding the TEP and reactive solvent hereof, and at least one component of the catalyst system hereof outside of said container. For example, it is contemplated that the initiator and/or accelerator component of the present invention may be incorporated into a separate holding means, such as a capsule or packet, adaptable to permit ready introduction of the container for the TEP and reactive solvent.

According to preferred embodiments, the cured adhesives of the present invention are characterized by the mechanical properties they exhibit, and specifically the stress-strain of the adhesive at various temperatures.

A. Physical Properties

According to especially preferred embodiments, the cured adhesives possess one or more of the following characteristics, and preferably all four:

(1) an elastic limit of from about 1% to about 5% strain;

(2) an elastic modulus of from about 250 ksi to about 400 ksi, where ksi is a thousand psi;

(3) a toughness of from about 200 psi to about 500 psi; and (4) a compressive lap shear strength of at least about 3 ksi.

As used herein, the term elastic limit, $\sigma_Y$, refers generally to the approximate stress at which the strain response of the sample being tested remains substantially elastic, and is determined according to procedures and methods well known in the art. As is known, the elastic limit of a material identifies the approximate boundary between the elastic and plastic regions on the stress-strain curve.

As used herein, the elastic modulus, E, is defined as follows:

$$E = \sigma/\epsilon$$

where: $\sigma$ is the stress of the material in the elastic region; and $\epsilon$ is the strain of the member in the elastic region.

As is known, the toughness of a material is the area under the stress-strain curve.

The lap shear strength of an adhesive material is the ability of that material to maintain a bond between two members and is determined in accordance with ASTM test method D 2564-93 (sec c-3.2) Unless otherwise specifically mentioned, all properties identified throughout the present specification refer to that property as measured at a temperature of about 75° F.

According to certain preferred embodiments, such as when the present compositions are intended to join PVC members, the elastic limit of the cured adhesive is preferably no less than about 2% and even more preferably no less than about 3% strain. Likewise, it is generally preferred that the cured adhesive compositions in such embodiments have an elastic modulus of at least about 300 ksi and a toughness of at least about 200 psi.

Importantly and desirably, the physical characteristics of the present compositions vary according to, among other conditions, the temperature of the composition. As will be understood by those skilled in the art, it is generally desirable for adhesive compositions to maintain important specified characteristics substantially over an entire range of expected operating temperatures. Although the operating temperature range of any particular adhesive will depend upon numerous factors regarding the expected application, the present adhesive compositions preferably have an operating temperature range of from about 33° F. to about 180° F., and even more preferably from about −30° F. to about 200° F. As used herein, the term "operating temperature range" refers to the ability of the present adhesive compositions, when cured, to maintain acceptable bond strength. With respect to preferred formulations, the cured adhesive systems of the present invention possess a desirable range of properties, including elastic limit, toughness and elastic modulus. With respect to preferred formulations, the cured adhesive systems of the present invention possess an elastic limit of no less than about 1% strain and a toughness of no less than about 250 psi for temperatures of from about 33° F. to about 180° F., while also achieving an elastic modulus of no less than about 250 ksi over substantially the same temperature range. The ability of the present sealant compositions to achieve desirable properties over the preferred ranges of operating temperatures contributes to the overall superior performance of the cured adhesive systems of the present invention, especially such systems in which the joined members are PVC, CPVC, and the like.

Applicants have found that the exceptional and unexpected toughness exhibited by the cured adhesive of the present invention is capable of producing bonded systems which, in some respects, may be superior to continuous lengths of the members being joined, as explained more fully hereinafter.

For temperatures of from about 33° F. to about 180° F., the present compositions, when cured, also preferably have a compressive lap shear strength of at least 2,000 psi. Applicants have found that the ability of the present adhesives to achieve a lap sheer strength of at least about 2,000 psi in temperatures as high as 180° F. contribute significantly to the beneficial properties of the present adhesive. More particularly, applicants have tested sections of PVC joined by the present adhesive at about room temperature and found that when such sections are subject to shear stress failure occurs almost always in the substrate as opposed to in the adhesive. Such a result is highly desirable for obvious reasons. Furthermore, when PVC sections are joined with the present adhesive and tested at a temperature of about 180° F., failure is found to occur at compressive lap shear values of about 2,000 psi, on average. Applicants have observed that in such high temperature testing, the failure occurs with substantially equal frequency in the pipe section as in the adhesive. It is apparent, therefore, that the compressive lap shear strengths of the adhesive and of the PVC members at about 180° F. are substantially equivalent. The obvious benefits of this result, which are wholly unexpected, is that the present adhesives can be used with great advantage even in high temperature applications.

In the uncured state, the adhesive compositions of the present invention are preferably relatively nonviscous, flowable compositions. As will be appreciated by those skilled in the art, high viscosity adhesive compositions, for example, adhesives having a viscosity at about room temperature of about 50,000 centipoise or greater, possess several undesirable features. For example, high viscosity adhesives are generally more difficult to apply and handle than low viscosity, readily flowable adhesives. Furthermore, the use of relatively high viscosity adhesive compositions produces relatively thick coatings of the adhesive on the members to be joined. Such thick coatings undesirably increase the amount of adhesive used for any particular application, and also may detrimentally impact upon the quality of the bond to be formed. Notwithstanding such disadvantages, many prior art adhesive systems relied on such high viscosity materials because it was heretofore generally accepted that superior bond strength is associated with adhesives having high viscosity in the uncured state. Applicants have surprisingly and unexpectedly found, however, that the preferred adhesives of the present invention at once exhibit both low viscosity and, when cured, high bond strengths. More specifically, the preferred adhesive compositions of the present invention preferably have a viscosity of from about 200 cps to about 2,000 cps, as measured by Brookfield LV Viscometer, using a #2 spindle at about 10 rpm.

B. The Components

1. The Reactive Solvents

The reactive monomers of the present invention must be capable of (a) solubilizing and/or dispersing the thermoplastic elastomeric polymer and (b) polymerizing, either with in situ or added catalyst, in the presence of the thermoplastic elastomeric polymer. While it is contemplated that the particular reactive solvent may vary depending upon, among other considerations, the particular thermoplastic elastomer being used, it is highly preferred that the reactive solvent comprise a free radical addition polymerizable acrylic component, including monomers, dimers, trimers, oligomers and mixtures of two or more of these, with acrylic monomer being preferred. Especially preferred are polymerizable acrylate or methacrylate ester monomers. The preferred reactive solvents, and particularly the reactive monomers, have relatively high boiling points, such as about 90° C. or greater, and low volatilities, such as vapor pressure of less than about 50 mm/mg at about 25.5. These properties of the preferred reactive monomers provide some advantage over prior solvent based adhesives. A more significant advantage, however, is achieved as a result of the present reactive solvents having essentially no volatility once reacted in accordance with the present invention. Thus, the cured systems of the present invention, including the reacted solvent portion of the adhesive, contains substantially no volatility and therefore provide a substantial and highly desirable reduction in VOC relative to previously used solvent based adhesives.

The preferred reactive monomers can be monofunctional or a combination of mono- and polyfunctional including difunctional monomers. Generally, the monomers are exemplified but not limited to those selected from the class consisting of alkyl acrylates, cycloalkyl acrylates, alkyl methacrylates, cycloalkyl methacrylates, alkoxy acrylates, alkoxy methacrylates, alkylene diacrylates and alkylene dimethacrylates, with methacrylates being preferred. Among the methacrylate monomers, C1–C4 alkyl methacrylates are preferred, with methyl methacrylate being most preferred. Preferably, the methacrylate-based ester monomer is selected from the group consisting of methyl methacrylate and ethyl methacrylate.

It is contemplated that in certain embodiments other reactive monomers can be used in combination with the methacrylate monomers.

The preferred acrylate monomers mentioned above may generally be represented by the formula:

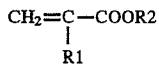

wherein R1 is H, CH$_3$ or lower alkyl, and R2 is H, alkyl, alkoxy, cycloalkyl, or alkylene group.

The reactive monomer preferably comprises at least about 50 weight percent methacrylate monomer and, even more preferably at least about 50 weight percent methyl methacrylate monomer. Most preferably, the methacrylate-based ester monomer consists essentially of methyl methacrylate.

The effective range of the reactive monomer to be used in the instant compositions may vary somewhat depending on the specific properties desired. It is generally preferred, however, that the reactive monomer comprise from about 50% to about 90% by weight of the adhesive composition, and even more preferably from about 60% to about 80% by weight. According to especially preferred embodiments, the composition comprises from about 70% to about 75% of the active monomer.

2. The Thermoplastic Elastomers

As used herein, the terms "thermoplastic elastomeric polymers" and "TEP" refer to thermoplastic copolymers having at least one relatively non-elastomeric segment and at least one relatively elastomeric segment. The term is intended to include within its scope not only block and graft copolymers which include distinct, covalently bound elastomeric and non-elastomeric polymer segments, but also to polymer blends comprising elastomeric polymer chains in physical mixture with relatively non-elastomeric polymer chains. It is also contemplated that one or more of the polymer chains in such blends may themselves be thermoplastic elastomers within the scope of the present invention. As will be appreciated, the copolymer of the present invention may comprise two or more polymeric compounds mixed together in intertwined domains or in interspersed domains. Thus, the term thermoplastic elastomer as used herein includes within its scope simple microscopically cellular mixtures of two or more polymers, interpenetrating polymer networks, graft copolymers, block copolymers and combinations of two or more of these.

The TEP preferably has a glass transition temperature of at least about 190° F., and even more preferably of from about 200° F. to about 250° F.

A preferred form of the TEP of the present invention is a copolymer comprising a non-elastomeric polymer backbone and an elastomeric polymer grafted to the polymer backbone. In view of the disclosure contained herein, it is contemplated that various non-elastomeric polymer backbones and grafted elastomeric polymer segments may be adaptable for use in accordance with the present invention. Applicants have found, however, that exceptional and unexpected results are achievable with TEPs comprising: (a) a non-elastomeric backbone formed from recurring units comprising monovinyl aromatic monomer, $\alpha,\beta$-unsaturated dicarboxylic acid anhydride monomer, $\alpha,\beta$-unsaturated carboxylic acid monomer, and C$_1$–C$_4$ alkyl ester of methacrylic acid monomer; and (b) an elastomeric block copolymer comprising blocks of monovinyl aromatic monomer and conjugated diene monomer grafted to the non-elastomeric backbone.

It is especially preferred that the polymer backbone comprise a random copolymer comprising from about 40 to about 75 weight percent of recurring units of a monovinyl aromatic monomer, from about 2 to about 25 weight percent of recurring units of an $\alpha,\beta$-unsaturated dicarboxylic acid anhydride, from about 2 to about 20 weight percent of recurring units of an $\alpha,\beta$-unsaturated carboxylic acid, and from about 1 to about 40 weight percent of recurring units of a C$_1$–C$_4$ alkyl ester of methacrylic acid. A copolymer of this type is disclosed in United States Statutory Invention Registration-H1128, which is incorporated herein by reference.

The number average molecular weight of the non-elastomeric copolymer backbone is preferably at least about 25,000 in order to develop adequate physical properties. Most preferably, the number average molecular weight is from about 50,000 to 120,000.

The monovinyl aromatic monomers suitable for use in the TEPs of this invention include any of the addition polymerizable monomers in which a carbon-carbon double bond is attached directly to an aromatic ring. Suitable monovinyl aromatic monomers include, but are not limited to, styrene, $\alpha$-methylstyrene, ar-methyl styrene, ar-ethyl styrene, ar-chlorostyrene, ar-bromostyrene, ar-(t-butyl)styrene, ar-cyanostyrene, ar-vinyl naphthalene, and mixtures thereof. The preferred monovinyl aromatic monomer is styrene.

The α,β-unsaturated dicarboxylic monomer capable may be any such monomer capable of copolymerization with the other comonomers comprising the copolymers of this invention. Examples of suitable α,β-unsaturated dicarboxylic acid anhydrides include maleic anhydride, chloromaleic anhydride, citraconic anhydride, tetrahydrophthalic anhydride, itaconic anhydride, methyl itaconic anhydride, and mixtures thereof. Maleic anhydride is the preferred α,β-unsaturated dicarboxylic acid anhydride.

The α,β-unsaturated carboxylic acids suitable for use in the thermoplastic copolymers of this invention contain a carbon-carbon double bond in conjunction with a carboxylic acid functionality, wherein the double bond is capable of addition polymerization with the other monomers. The preferred α,β-unsaturated carboxylic acid is methacrylic acid, although acrylic acid or a mixture of acrylic acid and methacrylic acid may also be used.

Suitable methacrylates include the $C_1$-$C_4$ alkyl esters of methacrylic acid, such as methyl methacrylate, ethyl methacrylate, propyl methacrylate, iso-propyl methacrylate, iso-butyl methacrylate, sec-butyl methacrylate, t-butyl methacrylate and mixtures thereof. The $C_1$-$C_4$ alkyl esters of methacrylic acid are preferred methacrylate monomer.

It is also generally preferred that the elastomeric block copolymer that is grafted to the non-elastomeric backbone comprise a styrene-butadiene block copolymer. Among the structures of these copolymers are those represented by (A)n-(B)m, (A-B)n, or (ABA)n, wherein A represents a polystyrene chain and B represents a polybutadiene chain; n and m are integers greater than or equal to one (1) and define the number of repeating units. The elastomeric block according to preferred embodiments has a glass transition temperature, prior to grafting with the polymer backbone. It will be appreciated, however, that the glass transition temperature of the various block portions in the preferred elastomeric copolymer are different. For example, the styrene block has a glass transition temperature of 90° C. while the butadiene block has a glass transition temperature of −90° C.

It is contemplated that the elastomeric polymer may be blended with the non-elastomeric copolymer following copolymerization of the polymer backbone. In such an embodiment the TEP will comprise a polymer blend. It is also contemplated that the elastomer may be present in the reaction mixture while the mixture of monomers is copolymerized. In this case, at least a portion of the elastomer will be grafted to the polymer backbone. Applicants have found that superior results are achieved, however, when the TEP comprises both grafted and blended elastomeric polymer chains. Accordingly, it is particularly preferred that the elastomer contain at least one ethylenically unsaturated functional group per elastomer chain which is capable of grafting onto the random copolymer during copolymerization. The grafting appears to promote uniform dispersion of the elastomer through the copolymer, thereby maximizing the improvement in impact properties. The elastomer is preferably present in the form of small particles dispersed in the copolymer continuous phase wherein the particles have an average diameter of less than about 10 microns. An average elastomer particle diameter in the range of from about 1 to about 5 microns is preferred. Mixtures of elastomers may be used. For example, one elastomer may be added during the copolymerization and a second elastomer blended with the product after copolymerization is completed.

Suitable elastomers include, but are not limited to, conjugated diene polymers, random or block copolymers of a conjugated diene and a monovinyl aromatic monomer, random copolymers of a conjugated diene and an unsaturated nitrile, terpolymers of ethylene, propylene, and a diene (EDPM type elastomers), hydrogenated random copolymers of a conjugated diene and a monovinyl aromatic monomer. As mentioned hereinbefore, the preferred conjugated dienes include butadiene and isoprene, while the preferred monovinyl aromatic monomer is styrene. Methods of preparing elastomers of these types are described in *Kirk-Othmer Encyclopedia of Chemical Technology* vol. 8, pp. 446–640, John Wiley, New York (1978), the teachings of which are incorporated herein by reference.

The amount of elastomer employed is from about 1 to about 35 parts by weight per 100 parts by weight of the non-elastomeric copolymer. The elastomer content is preferably from about 5 to about 25, most preferably from about 14 to 21, parts by weight per 100 parts by weight of the non-elastomeric copolymer. Low levels of elastomer may be insufficient to enhance the impact strength of the copolymer, while high levels may adversely affect the heat resistance and tensile properties of the resin composition.

3. The Catalyst System

Catalyst and Monomer Selection

The liquid compositions of the present invention cure or harden by a free-radical polymerization process. A number of methods of initiating the free-radical polymerization process are known and available, and all such methods are contemplated to be within the scope of the present invention. It is generally preferred, however, that the system include a combination of a free-radical initiator, generally a peroxide or hydroperoxide, and a free-radical accelerator, generally an amine or an amine derivative, often in combination with a metallic ion. Other free-radical generating species or initiators include sulfonyl halides, azo compounds, and other materials that can fragment or disassociate under the influence of a chemical accelerator, heat, ultraviolet or other forms of radiation, or combinations thereof to form free radicals.

The onset and continuation of the free-radical polymerization process by which the present compositions harden may be retarded by the action of dissolved oxygen, which acts by adding to the free-radical fragment, forming a relatively non-reactive species. The rate of the reaction between oxygen and the free radical fragment is much faster than the reaction with many of the preferred reactive solvents, such as acrylate or methacrylate monomer, and the small amount of dissolved oxygen can be highly effective in retarding or completely preventing the onset of polymerization. However, when all of the dissolved oxygen is consumed, and the diffusion of additional oxygen into the polymerizable composition is prevented, as when two closely mated parts are joined to form an adhesive bond, the polymerization process resumes, and the composition hardens. This principle is the basis for the behavior of the so-called "anaerobic" family of polymerizable acrylate or methacrylate adhesives, and the details of the compositions and the processes involved are well known to those skilled in the art. These compositions are most generally used to seal and fill gaps or voids and prevent loosening in metallic assemblies such as threaded fasteners, studs, retainers, and adhesively bonded joints.

It is contemplated that the present composition can be formulated to operate in such an anaerobic cure system and can be used to advantage in such applications. More particularly, this anaerobic behavior may be used to advantage in the formulation and use of the instant compositions in the joining of plastic pipe. Truly "anaerobic" adhesive compositions are generally formulated in such a way that they are fully catalyzed, that is, they generally contain a hydroperoxide and a tertiary aromatic amine, combined with certain free-radical inhibitors or stabilizers that allow them to be supplied as shelf-stable one-part or single-package adhesive systems. The instant compositions, on the other hand, may often or preferentially be supplied as two-package systems. In this case, certain ingredients that are used in the formulation of anaerobic adhesives may be incorporated as additives to extend the shelf life and working time of the formulated products before and after the combining of the two components. For the purpose of describing the elements of this invention, the terms "anaerobic effect" or "anaerobic behavior" will be used to describe the above phenomenon.

In one preferred embodiment of the present invention, the adhesive polymer-in-monomer composition is formulated in such a way that the polymerization process is not deliberately or substantially affected by the action of oxygen. Such compositions will generally contain methyl methacrylate or a methacrylate monomer with the structure represented by STRUCTURE M1 as the primary or exclusive reactive monomer species, wherein R1 is H, CH3 or other lower alkyl group, and R2 is CH3 or a linear or other alkyl or chemical group that does not contain an "active" hydrogen in its structure. For the purpose of this discussion, an active hydrogen is a hydrogen atom that is labile and capable of being abstracted by an active free radical species to form a free radical fragment, by which process the rate of polymerization may be slowed or retarded, especially in the presence of oxygen.

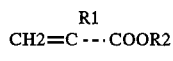

STRUCTURE M1

Certain beneficial effects, referred to above, may be obtained through the addition of monomeric or other chemical species that have the ability to delay the onset of the free-radical polymerization process, especially in the presence of oxygen, without substantially altering or impairing the polymerization process once it is initiated, preferably when the availability of oxygen is diminished or eliminated by mating the adhesively bonded surfaces. Such stabilization may be beneficial in (1) prolonging the useful storage life or "shelf life" of a one or two package (pre-catalyzed or separately packaged components) adhesive product, or (2) in prolonging the working time or "pot life" of a mixed two component or two package adhesive product after the two components are mixed for use.

One method of imparting this behavior, referred to by reference as anaerobic stabilization, is through the addition or incorporation of an appropriate amount of a monomer that has the ability to impart the stabilization process that is the basis for the technology of anaerobic adhesives. This behavior is most often and generally associated with acrylate and methacrylate monomers that have at least one additional double bond in their structure or that contain a heteroatom or other chemical grouping that imparts chemical activity or lability to a hydrogen atom connected to a carbon atom adjacent to that grouping. The theory and details of this process are well known and beyond the scope of this invention.

Monomers that are useful for this purpose may be monofunctional, difunctional, polyfunctional, acrylate or methacrylate monomers or combinations thereof. Difunctional and polyfunctional monomers are referred to herein for convenience as "multifunctional monomers" and will be referred to as such for the purpose of this discussion. In addition, the use of reactive solvents in the form of dimers, trimers and tetramers and higher, hereinafter referred to for convenience as "oligomers" can also assist in anaerobic stabilization.

The multifunctional monomers and oligomers may also affect other properties of the cured or hardened adhesive compositions. For example, certain oligomers with relatively short polymeric chains in their structure promote a high degree of crosslinking that can improve the heat and chemical resistance of the cured adhesive. Other oligomers with relatively long polymeric chains in their structure can impart both crosslinking and flexibility in the cured adhesive.

Both monomers and oligomers can have chemical groupings in their structures that can enhance other properties of the uncured and cured adhesive compositions. For example, polar chemical groupings, that is groupings containing heteroatoms such as oxygen, nitrogen, sulfur and chlorine, among others, are known to enhance the ability of a composition to dissolve or incorporate certain polymers or other materials such as oils. This effect can be beneficial in the formulation of a given composition (by enhancing the ability of a mixture of monomers and/or oligomers to dissolve or disperse polymers and additives) or in the ability of a composition to wet or partially solubilize the surface of an object to be bonded in order to improve the ease of the bonding process and the quality of the bond. Other chemical groupings, such as those containing acidic hydroxyl silane, or N-H groupings, among others, may be used to advantage for bonding polar or inorganic surfaces such as metals, metal oxides, ceramics, glass and other materials that achieve adhesion via hydrogen bonding and other related interactions.

It is readily apparent and within the capability of those skilled in the art to employ any combination of monomers and oligomers in order to achieve desired benefits for certain applications, and these principles are well known in the art and science of adhesive bonding. Since many organic polymers and inorganic materials can be used in the fabrication of pipe and piping systems, and combinations of such materials may be joined together to form piping assemblies, any number of the formulating principles referred to above may be used to impart certain beneficial properties for specific applications without departing from the spirit of the present invention.

It is apparent from the discussion above that there are interactions among the monomers and catalyst components that will influence their selection. With regard to the selection of peroxides, hydroperoxides, such as cumene hydroperoxide, methyl ethyl ketone (MEK) peroxide, and the like are most often associated with anaerobic stabilization and anaerobic adhesive formulations. Diacyl peroxides, such as benzoyl and lauryl peroxides, are most often associated with two part or two package acrylate or methacrylate adhesive formulations. Both groups of formulations employ amines and amine derivatives, often in combination with ionic metallic species, as accelerators for the free radical polymerization of the acrylate or methacrylate monomers. Another group of products employs sulfonyl chlorides in combination with amines and aldehyde-amine reaction products as a catalyst system that is effective with or without added peroxides and ionic metallic species. Combinations of these basic catalyst systems and their numerous enhancements have been used to achieve specific desired benefits, and the principles employed in their selection is well known to those skilled in the art.

4. Other Components

In addition to the basic monomer and polymer combinations used to formulate the compositions of this invention, other components well known in the art may be used to achieve specific benefits. These components and additives can be used to alter and modify the characteristics of both the uncured adhesive components and cured compositions. These materials are generally classified as stabilizers, chain transfer agents, comonomers, adhesion promoters, plasticizers, fillers, thickeners, pigments and colorants. Many of these materials can have more than one effect on the liquid or cured composition.

Free radical inhibitors such as phenols and quinones are used to stabilize acrylate and methacrylate monomers and compositions against premature polymerization during storage. Atmospheric oxygen and its interaction with the stabilizers and monomers are integral parts of the stabilization process. Metal chelators enhance stabilization by sequestering metal ions that can enhance premature polymerization. Epoxy resins and other acid acceptors can enhance stabilization of compositions whose premature polymerization may be influenced by traces of acidic species.

Chain transfer agents such as mercaptans are added to polymerizable compositions to regulate the rate of polymerization and control the resulting degree of crosslinking and molecular weight of the polymer. Comonomers such as styrene, alpha-methyl styrene, vinyl toluene and the like may be used in combination with the acrylate and methacrylate monomers, and can affect both the rate of polymerization and the properties of the cured compositions.

Acrylic and methacrylic acids, as well as maleic and other unsaturated carboxylic acids are comonomers that also function as adhesion promoters. Organosilanes and phosphorous compounds, including those containing acrylate, methacrylate, and other unsaturated and reactive groups in their structures are also effective adhesion promoters, especially for metallic or ceramic materials and glass.

Plasticizers, fillers, thickeners, pigments, and colorants are commonly used to formulate adhesive compositions of all chemical types. They may also be used to modify the compositions of the instant compositions, but additional care must be taken in their selection in order to avoid and prevent unwanted side reactions that may interfere with the chemical reactivity of the catalyst and monomer species.

II. THE ADHESIVE SYSTEMS

The present invention also provides adhesive systems comprising first and second members joined by cured adhesive according to the present invention. While it is contemplated that the members being joined may be formed from different and varied materials, the preferred adhesive systems comprise members formed from plastics, and even more preferably PVC, CPVC and the like. Furthermore, the preferred systems comprise at least a first conduit section formed from PVC joined to a second conduit formed from PVC.

Those skilled in the art will appreciate that numerous configurations are available for joining the first conduit section and the second conduit section in accordance with the present invention. According to preferred embodiments, the first conduit has a mating end portion forming a receiving channel and the second conduit has a mating end portion telescopically received in the receiving channel of the first conduit.

According to especially preferred embodiments, the cured adhesive systems of the present invention possess one or more of the following characteristics, and preferably all three:

(1) an elastic limit ratio of from about 0.8 to about 1.2;
(2) an elastic modulus ratio of from about 0.8 to about 1.2; and
(3) a toughness ratio of no less than about 0.9.

As used herein, the elastic limit ratio, $\sigma_{YR}$, is defined as follows:

$$\sigma_{YR} = \frac{\sigma_{YA}}{\sigma_{YM}}$$

where:

$\sigma_{YA}$ is the elastic limit or yield stress of the cured adhesive; and $\sigma_{YM}$ is the elastic limit or yield stress of the joined member having the lowest elastic limit. As is known, the elastic limit of a material identifies the boundary between the elastic and plastic regions on the stress-strain curve. According to highly preferred embodiments, the members being joined are formed of materials having the same or similar elastic limits, and in such embodiments the mechanical continuity of the adhesive system of the present invention is thus advantageously maximized.

As used herein, the elastic modulus ratio, $E_R$, is defined as follows:

$$E_R = \frac{E_A}{E_M}$$

where:

$E_A$ is Young's modulus of the adhesive; and $E_M$ is Young's modulus of the member with the lowest modulus.

As a result of this requirement, especially when the members being joined are formed of materials having the same or similar elastic limits, the mechanical continuity of the adhesive system of the present invention is advantageously maximized.

As used herein, toughness ratio, $T_R$, is defined as follows:

$$T_R = \frac{T_A}{T_M}$$

where:

$T_A$ is the toughness of the adhesive; and $T_M$ is the toughness of the least tough member. As is known, the toughness of a material is the area under the true stress-strain curve.

The cured adhesive systems of the present invention preferably possess an elastic limit ratio and a toughness ratio of no less than about 0.8 and even more preferably no less than about 0.9 for temperatures of from about 33° F. to about 180° F., while also achieving an elastic modulus ratio of from about 0.8 to about 1.2 over substantially the same temperature range. The ability of the present adhesive systems to achieve these ratios over such temperature ranges contributes to the ability of the adhesive systems to exhibit mechanical response continuity across the bond. That is, since the adhesive material formed in accordance with the present invention is capable of exhibiting a stress/strain response similar to the response exhibited by the underlying members, concentration of stress in either the adhesive material or the members being joined can be generally avoided. This preferred characteristic enhances the strength and stability of adhesive systems in accordance with the present invention. More specifically, the ability of the cured adhesives of the present invention to achieve an elastic limit which is substantially equivalent or superior to the weakest member being joined insures that undesirable plastic deformation and/or necking of the adhesive material does not occur prior to such phenomenon occurring in the joined members. As a result, an adhesive system is achieved in which plastic deformation of the bond will generally not occur upon the application of stress normally experienced by the member.

As is known in the art, the toughness of a material is a measure of the work per unit volume required to cause fracture of that material. As a result, tough materials generally have high strengths and high ductilities, thereby producing maximum area under the stress-strain curve. In certain embodiments, therefore, the high level of toughness exhibited by the cured adhesive of the present invention may actually serve to allow the presence of stress in the adhesive system to a degree that might otherwise cause fracture of the member being joined. Such a feature has obvious and significant advantages and benefits.

III. EXAMPLES

Example 1

About 33.3 parts by weight (PBW) of a thermoplastic elastomer in accordance with the present invention are dissolved in about 66.7 PBW of methyl methacrylate (MMA). About 0.3 to about 1 PBW of benzoyl peroxide are then added to the solution of copolymer in monomer to produce Part A of the adhesive composition. The copolymer is formed by copolymerization of styrene monomer, maleic anhydride monomer, methacrylic acid (MAA) monomer, MMA monomer, and a styrene-butadiene (SB) block copolymer in amounts to produce a copolymer consisting of about 51 wt % styrene groups, about 14 wt % maleic anhydride groups, about 6 wt % MAA groups, about 29 wt % MMA groups and about 18 wt % SB copolymer groups.

Part A of the composition is then initiated by adding about 0.2 PBW of hydroxy ethyl toluidine. The initiated composition, which has a workable pot life of about 60 min. is then applied in a thickness of about 5 mil. to each of two PVC substrates at a temperature of about 76° F. The substrates are then joined to achieve a set time in accordance with ASTM standards.

The physical properties achieved by the composition in accordance with this Example were measured and are reported in Table 1 below.

TABLE 1

| Property Measured | |
|---|---|
| Lap Shear (psi) (ASTM 02564) | 3,200 |
| Compressive Shear (psi) | 2,000–3,500 |
| Modulus (psi) | 300,000–400,000 |
| Toughness | 200–400 |

What is claimed is:

1. A high strength conduit for carrying potable water at temperatures of up to about 180° F. comprising:

a first tubular member having a mating end portion consisting essentially of a material selected from the group consisting of polyvinyl chloride, chlorinated polyvinyl chloride and mixtures thereof;

a second tubular member having a mating end portion consisting essentially of a material selected from the group consisting of polyvinyl chloride, chlorinated polyvinyl chloride and mixtures thereof telescopically received in said mating portion of said first tubular member; and a cured adhesive composition joining said mating end portions of said first and second tubular members, said cured adhesive composition being formed from a curable composition comprising:

(a) a minor proportion by weight of a thermoplastic elastomeric copolymer having a substantially random structure comprising:

(i) from about 40 to about 97 weight percent of recurring units of a monovinyl aromatic monomer, (ii) from about 1 to about 30 weight percent of recurring units of an $\alpha,\beta$-unsaturated dicarboxylic acid anhydride, (iii) from about 1 to about 30 weight percent of recurring units of an $\alpha,\beta$-unsaturated carboxylic acid, and (iv) from about 1 to about 40 weight percent of recurring units of a $C_1$–$C_4$ alkyl ester of methacrylic acid;

(b) on the basis of 100 parts of the thermoplastic elastomeric copolymer of (a), from about 1 to about 35 parts by weight of an elastomer comprising a block copolymer of butadiene and styrene;

(c) a major proportion by weight of reactive solvent for said thermoplastic copolymer, said reactive solvent comprising methyl methacrylate monomer; and (d) a catalyst for said reactive solvent.

2. The conduit of claim 1 wherein said cured adhesive composition is formed from a curable composition comprising from about 25% by weight to about 35% by weight of said thermoplastic elastomeric copolymer defined in (a).

3. The conduit of claim 1 wherein said cured adhesive composition is formed from a curable composition in which said reactive solvent consists essentially of reactive acrylates.

4. The conduit of claim 1 wherein either said first tubular member or said second tubular member fails under lap shear at about room temperature prior to failure of said cured adhesive.

5. The conduit of claim 1 wherein the lap shear strength of the weakest of said first and second tubular members is less than or substantially equivalent to the lap shear strength of said cured adhesive at temperatures up to 180° F.

6. The conduit of claim 1 having an elastic limit ratio of at least about 0.8.

7. The conduit of claim 1 having an elastic modulus ratio of at least about 0.8.

8. The conduit of claim 1 having a toughness ratio of at least about 0.8.

9. The conduit of claim 1 having:

an elastic limit ratio of at least about 0.8;

an elastic modulus ratio of at least about 0.8; and a toughness ratio of at least about 0.8.

* * * * *